(12) United States Patent
Forster

(10) Patent No.: US 8,633,821 B2
(45) Date of Patent: Jan. 21, 2014

(54) DUAL USE RFID/EAS DEVICE

(75) Inventor: Ian J. Forster, Essex (GB)

(73) Assignee: Avery Dennison Corporation, Mentor, OH (US)

( * ) Notice: Subject to any disclaimer, the term of this patent is extended or adjusted under 35 U.S.C. 154(b) by 646 days.

(21) Appl. No.: 11/949,112

(22) Filed: Dec. 3, 2007

(65) Prior Publication Data

US 2009/0140860 A1    Jun. 4, 2009

(51) Int. Cl.
*H04Q 5/22* (2006.01)
*G08B 13/14* (2006.01)

(52) U.S. Cl.
USPC ............. 340/572.1; 340/568.1; 340/572.8; 340/10.1

(58) Field of Classification Search
None
See application file for complete search history.

(56) References Cited

U.S. PATENT DOCUMENTS

| | | | |
|---|---|---|---|
| 3,765,007 A | 10/1973 | Elder | |
| 4,498,076 A | 2/1985 | Lichtblau | |
| 4,728,938 A | 3/1988 | Kaltner | |
| 5,495,229 A * | 2/1996 | Balch et al. | 340/572.4 |
| 5,822,685 A | 10/1998 | Forster | |
| 5,939,984 A | 8/1999 | Brady et al. | |
| 5,955,951 A * | 9/1999 | Wischerop et al. | 340/572.8 |
| 6,046,668 A | 4/2000 | Forster | |
| 6,121,878 A * | 9/2000 | Brady et al. | 340/572.1 |
| 6,281,797 B1 | 8/2001 | Forster et al. | |
| 6,369,772 B1 | 4/2002 | Forster | |
| 6,456,225 B1 | 9/2002 | Forster | |
| 6,480,062 B1 | 11/2002 | Forster | |
| 6,483,473 B1 | 11/2002 | King et al. | |
| 6,501,435 B1 | 12/2002 | King et al. | |
| 6,580,357 B1 | 6/2003 | Forster et al. | |
| 6,628,237 B1 | 9/2003 | Forster et al. | |
| 6,630,910 B2 | 10/2003 | Forster et al. | |
| 6,642,897 B2 | 11/2003 | Forster et al. | |
| 6,646,555 B1 | 11/2003 | Forster et al. | |
| 6,720,865 B1 | 4/2004 | Forster et al. | |
| 6,734,796 B2 | 5/2004 | Forster et al. | |
| 6,744,367 B1 | 6/2004 | Forster | |

(Continued)

FOREIGN PATENT DOCUMENTS

FR    2901041    11/2007
WO    2006057888    6/2006

OTHER PUBLICATIONS

International Search Report and Written Opinion from corresponding International Application No. PCT/US08/76478.

(Continued)

*Primary Examiner* — Julie Lieu
(74) *Attorney, Agent, or Firm* — Avery Dennison Corporation

(57) ABSTRACT

A radio frequency identification (RFID) device has multiple modes of operation. One of the modes of operation is an electronic article surveillance (EAS) mode, which is used to allow use of the RFID device as an EAS device. Another mode of operation is an RFID mode, which allows normal function of the RFID device in RFID communications. The EAS mode has greater sensitivity than the RFID mode, requires less power than the RFID mode to operate the device, and requires less current and/or voltage for operation. The EAS mode may achieve these different characteristics by one or more of: switching off some digital blocks in the circuitry of the RFID device; reducing power storage required to respond to incoming signals; reducing the length of response to incoming signals; reducing modulation required for a response; changing chip input impedance; and having multiple chip ports with different impedances.

17 Claims, 2 Drawing Sheets

(56) References Cited

U.S. PATENT DOCUMENTS

| | | |
|---|---|---|
| 6,778,088 B1 | 8/2004 | Forster |
| 6,799,027 B1 | 9/2004 | Forster |
| 6,806,842 B2 | 10/2004 | King et al. |
| 6,828,941 B2 | 12/2004 | King et al. |
| 6,847,912 B2 | 1/2005 | Forster |
| 6,853,345 B2 | 2/2005 | King et al. |
| 6,853,347 B2 | 2/2005 | Forster et al. |
| 6,894,614 B2 | 5/2005 | Eckstein et al. |
| 6,894,616 B1 | 5/2005 | Forster |
| 6,895,226 B1 | 5/2005 | Forster et al. |
| 6,895,655 B2 | 5/2005 | Forster et al. |
| 6,903,704 B2 | 6/2005 | Forster et al. |
| 6,914,562 B2 | 7/2005 | Forster |
| 6,975,834 B1 | 12/2005 | Forster |
| 6,985,119 B2 | 1/2006 | Forster et al. |
| 7,002,475 B2 | 2/2006 | Brady et al. |
| 7,019,651 B2 | 3/2006 | Hall et al. |
| 7,046,122 B1 | 5/2006 | Forster |
| 7,046,957 B1 | 5/2006 | Farr et al. |
| 7,055,754 B2 | 6/2006 | Forster |
| 7,057,562 B2 | 6/2006 | Forster et al. |
| 7,059,518 B2 | 6/2006 | Forster |
| 7,084,770 B2 | 8/2006 | Brady et al. |
| 7,088,248 B2 | 8/2006 | Forster |
| 7,093,345 B2 | 8/2006 | Forster et al. |
| 7,098,850 B2 | 8/2006 | King et al. |
| 7,102,520 B2 | 9/2006 | Liu et al. |
| 7,109,867 B2 | 9/2006 | Forster |
| 7,123,204 B2 | 10/2006 | Forster et al. |
| 7,154,283 B1 | 12/2006 | Weakley et al. |
| 7,158,033 B2 | 1/2007 | Forster |
| 7,158,037 B2 | 1/2007 | Forster et al. |
| 7,164,353 B2 | 1/2007 | Puleston et al. |
| 7,170,415 B2 | 1/2007 | Forster |
| 7,180,423 B2 | 2/2007 | Forster et al. |
| 7,183,917 B2 | 2/2007 | Piccoli et al. |
| 7,190,319 B2 | 3/2007 | Forster et al. |
| 7,191,507 B2 | 3/2007 | Forster et al. |
| 7,193,563 B2 | 3/2007 | King et al. |
| 7,212,127 B2 | 5/2007 | Jacober et al. |
| 7,224,273 B2 | 5/2007 | Forster |
| 7,224,280 B2 | 5/2007 | Ferguson et al. |
| 7,225,992 B2 | 6/2007 | Forster |
| 7,233,250 B2 | 6/2007 | Forster |
| 7,234,642 B2 | 6/2007 | Forster |
| 7,239,287 B2 | 7/2007 | Forster |
| 7,273,173 B2 | 9/2007 | Forster |
| 7,275,040 B2 | 9/2007 | Forster et al. |
| 7,292,148 B2 | 11/2007 | Forster |
| 7,295,117 B2 | 11/2007 | Forster et al. |
| 7,298,266 B2 | 11/2007 | Forster |
| 7,298,267 B2 | 11/2007 | Forster |
| 7,298,330 B2 | 11/2007 | Forster et al. |
| 7,298,343 B2 | 11/2007 | Forster et al. |
| 7,306,162 B2 | 12/2007 | Forster |
| 7,307,527 B2 | 12/2007 | Forster |
| 2004/0263319 A1 | 12/2004 | Huomo |
| 2006/0158316 A1 | 7/2006 | Eckstein |
| 2006/0273902 A1* | 12/2006 | Shafer et al. ............... 340/572.1 |
| 2007/0011893 A1* | 1/2007 | Garber et al. ................... 33/286 |
| 2008/0088460 A1* | 4/2008 | Copeland ................. 340/572.7 |
| 2008/0174437 A1* | 7/2008 | Arguin ....................... 340/572.7 |
| 2008/0204247 A1* | 8/2008 | Lian et al. ................. 340/572.3 |
| 2009/0066516 A1* | 3/2009 | Lazo ........................... 340/572.7 |
| 2010/0001863 A1* | 1/2010 | Salim et al. ................ 340/572.1 |

OTHER PUBLICATIONS

International Preliminary Report on Patentability issued in corresponding IA No. PCT/US08/76478 dated Feb. 12, 2010.

* cited by examiner

DUAL USE RFID/EAS DEVICE

BACKGROUND OF THE INVENTION

1. Field of the Invention

The invention is in the field of devices and methods for radio frequency identification (RFID) and electronic article surveillance (EAS).

2. Description of the Related Art

Radio frequency identification (RFID) tags and labels (collectively referred to herein as "devices") are widely used to associate an object with an identification code. RFID devices generally have a combination of antennas and analog and/or digital electronics, which may include for example communications electronics, data memory, and control logic. For example, RFID tags are used in conjunction with security locks in cars, for access control to buildings, and for tracking inventory and parcels.

As noted above, RFID devices are generally categorized as labels or tags. RFID labels are RFID devices that are adhesively or otherwise have a surface attached directly to objects. RFID tags, in contrast, are secured to objects by other means, for example by use of a plastic fastener, string or other fastening means.

RFID devices include active tags and labels, which include a power source, and passive tags and labels, which do not. In the case of passive devices, in order to retrieve the information from the chip, a "base station" or "reader" sends an excitation signal to the RFID tag or label. The excitation signal energizes the tag or label, and the RFID circuitry transmits the stored information back to the reader. The RFID reader receives and decodes the information from the RFID tag. In general, RFID tags can retain and transmit enough information to uniquely identify individuals, packages, inventory and the like. RFID tags and labels also can be characterized as to those to which information is written only once (although the information may be read repeatedly), and those to which information may be written during use. For example, RFID tags may store environmental data (that may be detected by an associated sensor), logistical histories, state data, etc.

As the name implies, electronic article surveillance (EAS) is concerned with the embedding or attaching of a security label or tag to a retail item to deter shoplifting. Conventional EAS devices or tags include a resonator that, when activated, causes an alarm to sound when the EAS tag is brought within operative proximity of detection apparatus (which is typically located at the exit of a store). However, if the EAS device is active, a similar signal will also be produced each time that a customer either properly removes purchased goods from the store or enters another store with similar detection apparatus. Generally, EAS tags are inexpensive and disposable items that are not removed from merchandise during check out (which is generally true for RFID tags as well). For these reasons, a variety of different techniques have been developed to deactivate EAS tags, typically by a clerk during check out using deactivation apparatus that needs no physical contact with the tag.

Various types of EAS devices and deactivation systems make use of specially configured tags or labels in connection with an apparatus for positively deactivating such tags or labels. A first example is the EAS tag described in U.S. Pat. No. 4,498,076 to Lichtblau. The Lichtblau tag is provided with a resonant circuit having a capacitor portion with an indentation that permits the resonant circuit to be deactivated according to methodology as described in U.S. Pat. No. 4,728,938 to Kaltner, for example. The Lichtblau EAS tag is readily deactivated at the point of sale by subjecting the tag or label to a relatively high-powered signal which, because of the mechanical indentation, is sufficient to cause a short circuit within the tag or label for deactivation.

Another type of EAS tag, sometimes called a magnetomechanical EAS tag, uses the technology disclosed in U.S. Pat. No. 3,765,007 to Elder. Magnetomechanical tags include an active element and a bias element. When magnetized, the bias element applies a bias magnetic field to the active element which causes the active element to be mechanically resonant at a predetermined frequency upon exposure to an interrogation signal which alternates at the predetermined frequency. This tag requires a relatively high magnetic field level for activation and deactivation. Activation and deactivation is accomplished by exciting a coil wound around a magnetic core.

Some effort has been made to combine an RFID device and an EAS device within a single device. U.S. Pat. No. 7,109,867 to Forster describes a device that includes both an RFID device and an EAS device. U.S. Pat. No. 7,002,475 to Brady describes an RFID tag that includes a non-linear magnetic material in its antennas, allowing it to function also as an EAS device. Both of these combinations involve additional structural elements to perform the two functions in the same device.

From the forgoing it will be appreciated that improvements are possible for RFID devices.

SUMMARY OF THE INVENTION

According to an aspect of the invention, an RFID device has a relatively low sensitivity RFID mode for communicating with RFID readers/detectors, and a relatively high sensitivity EAS mode for communicating with EAS readers/detectors.

According to another aspect of the invention, an RFID device also functions as an EAS device, by employing an EAS mode with different characteristics than for normal operation.

According to yet another aspect of the invention, a UHF RFID device also functions as an EAS device, without any particular structure used in the EAS device function.

According to still another aspect of the invention, a radio frequency identification (RFID) device includes: an antenna; and a chip operatively coupled to the antenna. The chip includes circuitry to selective operate the RFID device two modes: a relatively low sensitivity RFID mode used for communicating with RFID readers/detectors; and a relatively high sensitivity electronic article surveillance (EAS) mode for communicating as EAS readers/detectors.

According to a further aspect of the invention, a method of utilizing an RFID device for use as an electronic article surveillance (EAS) device, includes the steps of: entering an improved sensitivity mode of operation that improves sensitivity over that of a normal mode of operation that is used for RFID communication; and while in the improved sensitivity mode, communicating with an EAS reader/detector.

According to a still further aspect of the invention, a radio frequency identification (RFID) tag includes: a chip; and an antenna operatively coupled to the chip. The chip including circuitry for operation between a first mode and a second mode. Each of the first and second modes operate at a different sensitivity.

According to another aspect of the invention, a radio frequency identification (RFID) tag, includes a chip; and an antenna operatively coupled to the chip. The chip includes circuitry for operating at a normal mode and at least a second mode, and wherein the chip selectively operates between the normal mode and the second mode. The chip deactivates one of the normal mode and second mode on receipt of a signal.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the annexed drawings, which are not necessarily to scale.

DETAILED DESCRIPTION

A radio frequency identification (RFID) device has multiple modes of operation. One of the modes of operation is an electronic article surveillance (EAS) mode, which is used to allow the RFID device to function better as an EAS device. Another mode of operation is an RFID mode, which allows normal function of the RFID device in RFID communications. The EAS mode has greater sensitivity than the RFID mode, requires less power than the RFID mode to operate the device, and requires less current and/or voltage for operation. The EAS mode may achieve these different characteristics by one or more of the following: switching off unnecessary digital blocks in the circuitry of a chip or other electronics of the RFID device; reducing power storage required to respond to incoming signals; reducing the length of response to incoming signals; reducing modulation required for a response; changing chip input impedance; and having multiple chip ports with different impedances.

The RFID device may be a device configured to interact with UHF (ultra high frequency) signals, for example in the range of 300 MHz to 3 GHz. The antenna gain and efficiency for a given size are inversely related. As an example, at 600 MHz and 300 MHz, for a given distance the propagation loss at 300 MHz is 6 dB lower than at 600 MHz. If an antenna size of 250 mm is available, there can be a half wave dipole at 600 MHz, with no folding. At 300 MHz there will have to be folding or other arrangement of the elements of the antenna to fit into the space, which tends to reduce efficiency, gain and/or bandwidth. There are trade-offs involving size and frequency regarding other characteristics or features, such as adsorption loss and read infrastructure. The shifting between modes may be done automatically by the device based upon the characteristics of incoming signals to the device. Alternatively a control signal or control signals may be sent to the RFID device to specifically cause the RFID device to shift between modes. The modes may be alternatively activatable. Alternatively it may be possible for both modes to be active at the same time, and for the RFID device to communicate simultaneously in both modes. Control signals may also be used to temporarily or permanently disable operations in one or both modes.

Figure 1:
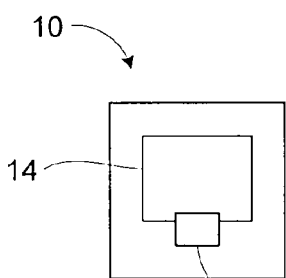
FIG. 1 is a diagram of a radio frequency identification (RFID) device in accordance with an embodiment of the present invention.

FIG. 1 shows a simplified layout of an RFID device 10. The RFID device 10 includes a chip or integrated circuit 12 and an antenna 14. The antenna 14 may have any of a variety of well-known configurations, such as that of a loop antenna, dipole antenna, or slot antenna. The antenna 14 is operatively directly or indirectly electrically coupled to contacts of the chip 12 in order to send and receive signals in communication with another device, such as a reader or a detector. The communication may be more passive, with the RFID device 10 drawing power from an electric field, a magnetic field, or a propagating electromagnetic wave (or any combination thereof) produced by a reader or a detector, and using the power to alter or modulate the electrical field. References elsewhere herein to use of an electric field should be understood as alternatively involving a magnetic field, a propagating electromagnetic wave, or any combination electric fields, magnetic fields, and propagating electromagnetic waves. Alternatively, the communication may be active communication, with signals actually broadcast from the RFID device 10.

The chip 12 may be any of a variety integrated circuit devices used for controlling communication of the RFID device 10. Functions of the chip 12 are carried out by circuitry of the chip, using a variety of well-known electronic structures. The chip 12 may be directly connected to the antenna 14, or may alternatively be coupled to the antenna 14 using an intervening structure such as an interposer or strap. Such an interposer or strap may have conductive leads that facilitate electrical connection between the chip 12 and the antenna 14. Such electrical connection may be an electrical connection direct contact, characterized by a low electrical resistance, or alternatively a reactive electrical connection, where the contact is via an electric field, magnetic field, or combination.

The RFID device 10 may be embodied as a label or a tag, and may be attached or mechanically coupled to an object in any of a wide variety of ways. The RFID device 10 may include a variety of other layers including adhesive layers, release layers, printable layers, and/or coating layers.

Figure 2:
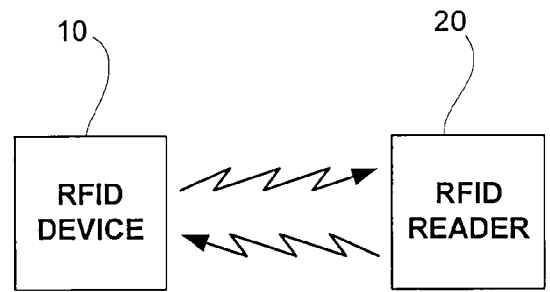
FIG. 2 is a diagram of the RFID of FIG. 1 in communication with an RFID reader/detector.
Figure 3:
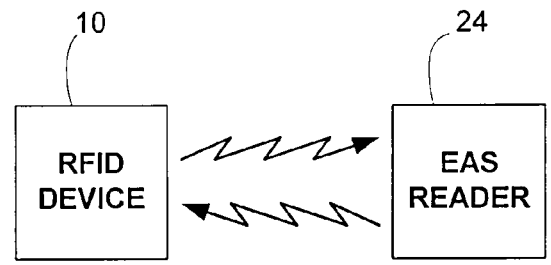
FIG. 3 is a diagram of the RFID of FIG. 1 in communication with an RFID reader/detector.

Referring now to FIGS. 2 and 3, the RFID device 10 has an RFID mode of operation that is suitable for communication with an RFID reader or detector 20. The RFID device 10 also has an EAS mode of operation that is suitable for communication with an EAS detector 24 (FIG. 3). The circuitry of the chip 12 may control which mode the RFID device 10 is operating in at any given time. The selection of RFID mode or EAS mode may be made automatically by the RFID device 10, based on characteristics of the incoming signals received by the RFID device 10, or on characteristics of UHF signals detected by the RFID device 10. Alternatively or in addition, the RFID device 10 may be configured to shift mode, and/or to deactivate communication in either mode, upon receipt and processing or one or more specialized control signals. As another alternative, the RFID device 10 may be able to operate in both modes simultaneously.

The RFID device 10 operates differently in the RFID mode and the EAS mode, to account for the different environments encountered in RFID and EAS communications, and the different requirements and desirable characteristics of RFID and EAS communications. For instance, EAS environments involve situations where intervening objects, such as people, may be placed between the RFID devices and a reader/detector to detect such objects in an EAS application. UHF far field penetration is relatively poor through wet dielectric objects such as people. The term "far field" is used in contrast to the term "near field," which refers to a region closer to an antenna. Both terms describe the fields around an antenna (or any other electromagnetic radiation source). The boundary between the near field and the far field is often taken to be a distance from the antenna equal to $\lambda/2\pi$, where $\lambda$ is the wavelength of the radiation being emitted by the antenna, although it should be realized that sufficient energy is available to operate a RFID device designed to couple via magnetic or electric field coupling at ranges much greater than this depending on the interrogator antenna design and power input. It is commonly understood that the region where powering via a primarily single field component, retaining the advantageous characteristics of near field coupling, is possible out to approximately 1 wavelength away from the read system.

Accordingly, it is desirable for the RFID device 10 to have better sensitivity in the EAS mode than in the RFID mode. From another point of view, it is desirable for the RFID device 10, when in the EAS mode, to be activated with less power than in the RFID mode. This can be accomplished by having the RFID device 10 use less power when in the EAS mode than when in RFID mode.

The frequency in the EAS mode may be within the UHF range given above, or may be at lower frequency out of the UHF range given above. For example, the frequency in the EAS mode may be as low as 100 MHz. At higher frequency there is generally more available bandwidth. For the lower frequencies, generally available bandwidths are much smaller, so a low bandwidth protocol, such as ISO180006-A can be used, which is a "tag talks first" protocol that does not involve reader modulation, and has the additional advantage or requiring much simpler logic and no analogue receive section in the chip, reducing power consumption and increasing range.

Figure 4:
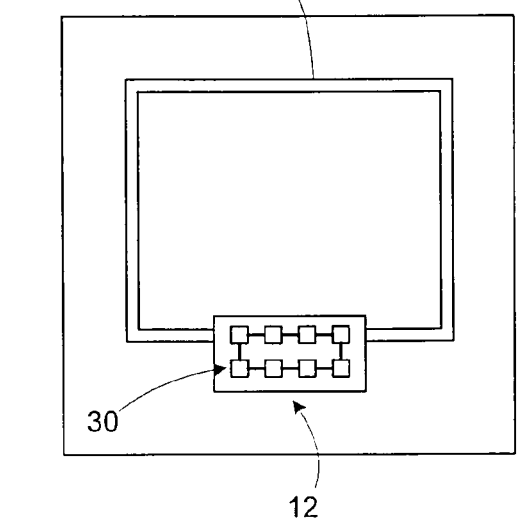
FIG. 4 is a diagram of an RFID device in accordance with another embodiment of the present invention.

FIG. 4 illustrates one way in which the RFID device 10 may have its operation modified in the EAS mode. The chip 12 has a number of digital blocks 30 in its circuitry. The digital blocks 30 control various functions of the RFID device, such as access to memory, reading and writing of memory, receiving and processing commands, generating CRC's, security functions such as passwords and encryption, generating specific response messages, and handling a contention access protocol. Some of these functions are not necessary for use of the RFID device 10 in an EAS function. The EAS mode may involve the chip 12 shutting down certain of the digital blocks 30 that are necessary for communication in the EAS mode. For example, the digital blocks 30 for keeping items in memory may not be needed for the EAS function, since the response from the RFID device 10 in EAS mode can be a single virtual bit when the device 10 encounters an electric field (or the alternatives described elsewhere herein) from an EAS device detector or reader. The RFID device 10, whenever in the EAS mode, may respond by sending this single virtual bit whenever it senses the presence of an EAS device detector. By shutting down some of the digital blocks 30, power consumption of the RFID device 10 is reduced, the power requirement for activating the RFID device 10 is thereby also reduced, and the sensitivity of the RFID device 10 is thus increased. It will be appreciated that a wide variety of digital blocks can be shut off or temporarily disabled for the EAS mode. For example, in the ISO180006-A protocol, the logic is a shift register with taps to generate pseudo-random delays, which then simply clocks a shift register containing a code to the output modulator at intervals. More simply, the device can reflect a simple tone when it has sufficient power, using a low modulation depth on the reflective modulator so it can still receive sufficient energy—in fact, the modulation transistor itself, which is across the RF input, can be configured as a relatively low frequency oscillator, so the only parts of the chip operating are a rectifier and modulation transistor.

Figure 5:
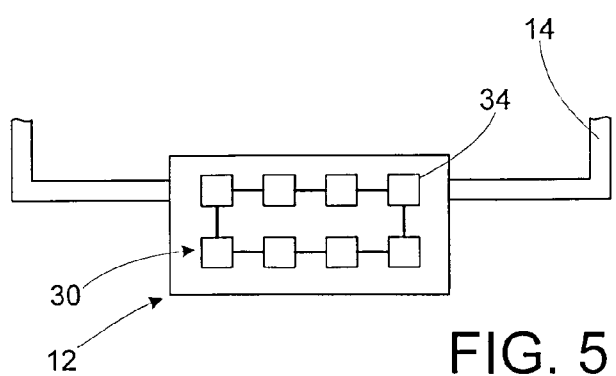
FIG. 5 is a diagram of part of an RFID device in accordance with still another embodiment of the present invention.

FIG. 5 illustrates another option of the changes for the EAS mode, in which the RFID device 10 does not store as much power in the EAS mode. The digital blocks 30 include a power storage block 34 that stores power for the RFID device 10 to perform a response to a situation. The power storage block 34 may include, for example, a charge pump/regulator with a capacitor or capacitors to store energy. For example the power stored in the power storage block 34 may be used to send a message along the antenna 14 or to reflect the incoming signal to modulate the electric field (or alternatives to the electric field) in the vicinity of the RFID device 10. In passive RFID tags, communication back to the reader system is commonly achieved using a modulated reflection, also commonly referred to as a modulated backscatter. In this technique the input impedance of the chip is changed by a data-carrying signal. In a simple implementation, the first impedance is that of the chip in the state it received power and commands from a reader system, and the second impedance is a lower impedance caused by a transistor across the chip antenna connection terminals being switched on. If we assume that the antenna impedance is a conjugate match to the chip impedance in its first state, all the power received by the antenna will be adsorbed by the chip. When the modulator transistor is switched on, presenting a second impedance, a portion of the power will now be reflected and re-radiated by the antenna towards the reader/interrogator. This can be considered as a form of reflective amplitude modulation, and creates a detectable signal in a properly designed reader system. In real world tag designs, frequently the reflected signal is generated by a combination of amplitude and phase modulation, and the chip may have more than two impedance states to enhance the modulation characteristics.

As noted in the previous paragraph, the signal from the RFID device 10 may be a single virtual bit in the EAS mode. It will be appreciated that the power required to send a single virtual bit is much less than that required to send a longer string of bits, such as often is done for RFID communication, where transmission of particular device information may be required. Thus the power required to operate in the EAS mode may be significantly less than the power required to operate in RFID mode. Since less power is required for activation of the RFID device 10, the chip 12 may include instructions to respond in the EAS mode with less power stored in the power storage block 34 than would be necessary for RFID communication in the RFID mode. This means that in this embodiment the RFID device 10 has greater sensitivity because it requires less power to be stored before it is activated to communicate. It will be appreciated that less power storage may be required for the EAS mode for other reasons than a shorter communication response.

The shorter response discussed above may involve sending only part of the normal communication message sent in the RFID mode. For example, in the RFID mode the RFID device 10 may be configured for sending a full information-carrying signal, carrying a potentially wide variety of information about the RFID device 10, such as information individual to the RFID device 10 and to the object that the RFID device 10 is mechanically coupled to. In EAS mode it may be sufficient to omit some or all of the individualized information. As one example, in the EAS mode the RFID device 10 may be configured to send only a partial response, such as a preamble section of a normal communication sent in the RFID mode.

The RFID device 10 may also make a reduced modulation response in the EAS mode, with the modulation reduced relative to the RFID mode. This may be done in addition to or alternatively to the above changes for the EAS mode. As the chip 12 makes a reflected response it sends forth a continuous sequence of 1 and 0 bits at a known frequency. In the EAS mode the chip 12 may be configured to reflect an incoming signal with less of an impedance change than in the RFID mode. Since the chip 12 is reflecting less it can rectify power during the response period. This enhances the sensitivity of the RFID device 10 when it is communicating in the EAS mode. The weaker response in the EAS mode might be a problem for RFID communication, as RFID communication ordinarily requires broadband communication. However, for the EAS mode it may be acceptable to communicate in a narrowband tone. An EAS reader may be configured to have its effective bandwidth reduced. This reduces the noise floor for communication between the RFID device 10 (in EAS mode) and the EAS reader/receiver. This enables detection of weaker signals (increased sensitivity).

The chip 12 impedance may also be changed for the EAS mode. In RFID communication it is desirable that the chip and the antenna of a device not be an exact conjugate match, in order to achieve optimal bandwidth about a desired frequency. Such bandwidth may be desirable in RFID communication, since RFID readers/detectors may need to communicate with multiple RFID devices at the same time. This need to have the capability to communicate with multiple RFID devices simultaneously leads to a desirability for some significant bandwidth in the RFID communication system. Such systems may require a substantially stable frequency during communication, such that fast frequency hopping is not desirable. A narrower bandwidth may be acceptable for the EAS mode, since EAS systems often do not require any sort of complex information exchange between devices and readers, so in that instance frequency hopping may be acceptable. In addition, the short communications of EAS systems, and the requirements of such systems, lessen or avoid altogether the need of a capability of communicating with multiple devices simultaneously. The impedance of the chip 12 may be alterable in any of a variety of ways, which may be internally switchable within the chip 12. One method of altering the impedance is by changing the load presented to the rectifier circuits, as the input impedance is partially dependant on the current flow through the rectifier. Other methods involve the use of non-volatile memory cells which provide bias to sections of the circuit, or having a series of transistors controlled by memory cells connecting capacitors formed on the chip across the input.

Figure 6:
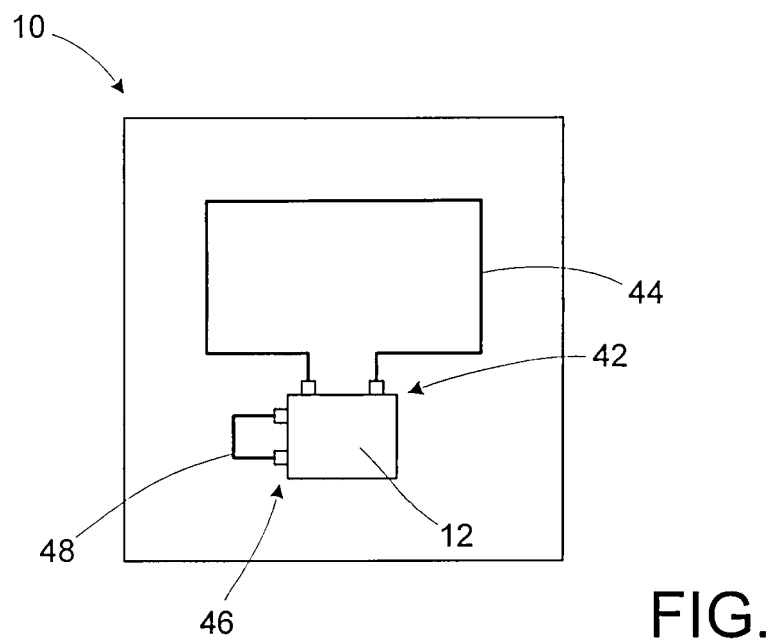
FIG. 6 is a diagram of an RFID device in accordance with a further embodiment of the present invention.

Referring now in addition to FIG. 6, the chip 12 may have a first set of contacts (first port) 42 for connection to a first antenna 44, and a second set of contacts (second port) 46 for connection to a second antenna 48. The first contacts 42 and the first antenna 44 may be used for communication in the RFID mode, and the second contacts 46 and the second antenna 48 may be used for communication in the EAS mode. The contacts/antenna combinations may be optimized for the individual characteristics of their respective modes. The first contacts 42 may have different impedance than the second contacts 46. The first contacts 42 may be configured to work well with far field antennas and give broadband frequency responses, for communication in the RFID mode. This may be accomplished by keeping the ratio of the real and reactive parts of the first contacts 42 relatively low. This is the equivalent of the concept of Q in low frequency circuits. The term Q in this context relates to the behavior of a resonant tuned circuit, comprising an inductance, presented by the antenna, a capacitance presented by the chip and a resistance presented by the chip and any other energy loss mechanisms in the structure, such as dielectric loss in materials. One definition of Q is the ratio of the total energy stored to the energy lost per cycle. Energy is stored in the inductor and capacitor (at zero voltage all the energy is in a magnetic field in the inductor, at zero current the energy is stored in the capacitor as a voltage) and the resistance dissipates energy. Q is calculated for a parallel model, the most appropriate for an RFID chip input, as the ratio of resistance to reactance. For a resonant circuit $X_L$ and $X_C$ are equal, but in practical terms there may be a high resistance and a high capacitance/low inductance. A high Q circuit can be useful for the input of an RFID chip is that it can effectively multiply the AC voltage at the chip input, where the AC voltage represents the energy stored, which can be higher than the energy delivered per cycle by the radio frequency source. This is important as two factors determine the ability of an RFID chip to operate: one is getting enough power, and the other is getting enough RF voltage at the input to allow the rectifiers to function. Rectifiers, either diodes or synchronous types using transistors, tend to have a threshold voltage where forward conduction starts. For diodes, this may range from approximately 0.3V to 0.7V for silicon devices, depending on doping levels. This threshold can be reduced, but at a point, the reverse leakage current of the diode when reverse biased becomes large, and effectively the efficiency of the conversion of RF energy to DC voltage becomes unusable. So making a chip with very low power consumption will not always ensure that it will operate at low RF power inputs, as the voltage has to be large enough. By having a high resistance input, and using resonance, higher voltages can be achieved, although the chip cannot draw higher power than is delivered per cycle to the circuit, or the voltage drops. The negative impact of higher Q is that the bandwidth of operation is greatly reduced—a typical measure is the 3 dB bandwidth $\Delta F = f/Q$. This narrow bandwidth may present a problem for normal RFID operations, where consistent performance over a band is desired. However, for an EAS function, as there is no time consuming communication or protocol taking place, so it is possible to rapidly scan through a frequency band to find the operating frequency of a tag in EAS mode, overcoming the problem caused by both the narrow bandwidth and de-tuning effects from attempts to defeat the EAS function. The higher sensitivity achievable in EAS mode may also allow a lower power transmission to be used for detection, and, depending on regulatory limits, a broader bandwidth, again improving the chances of catching a deliberately off-tuned tag device. The fast frequency hopping spread the reader energy effectively over a band so also reduces the impact on other systems. The second contacts 46 thus may have a higher real-to-reactive ratio (high Q), suitable for use in the EAS mode. For example a chip may have a real part of 10000 ohms and a capacitance of 2 pF (~87 ohms reactive at 915 MHz). This gives a theoretical maximum unloaded Q of ~115, but the chip adsorbing energy from the circuit, will reduce the effective loaded Q to a lower value. The characteristics of the second contacts 46 may generate a higher voltage for any given input power, which results in greater sensitivity, at least in a voltage limited situation. Such characteristics are more suited to near-field reading and use in the EAS mode, but would be less suitable for regular RFID communication.

It will be appreciated that many possible ways of selecting a mode of operation. For instance the device may be configured to only reply in EAS mode when a set of conditions are met. For chips having multiple inputs (contacts or ports), such conditions may include on which input a command (if any) is received. For example, if a chip has two inputs, one for EAS communication and one for RFID communication, the system may be set to respond in EAS mode if a communication, such as an EAS-type communication, is received on both inputs. If the same communication is received on only an input coupled to an RFID antenna, the device may be configured to not respond at all. This enables the possibility of deactivating the EAS function by physically breaking the antenna used for EAS communication. Such an alteration would leave the device still able to function as an RFID device. It will be appreciated that many other variations are possible.

An alternative configuration would be to have a single antenna coupled to both first set of contacts 42 and 46. The sets of contacts 42 and 46 may be coupled to different respective points on the single antenna, representing different matching conditions. As another alternative, the sets of contacts may be connected to different elements in the same antenna, with the contact sets sharing one a contact.

Figure 7:
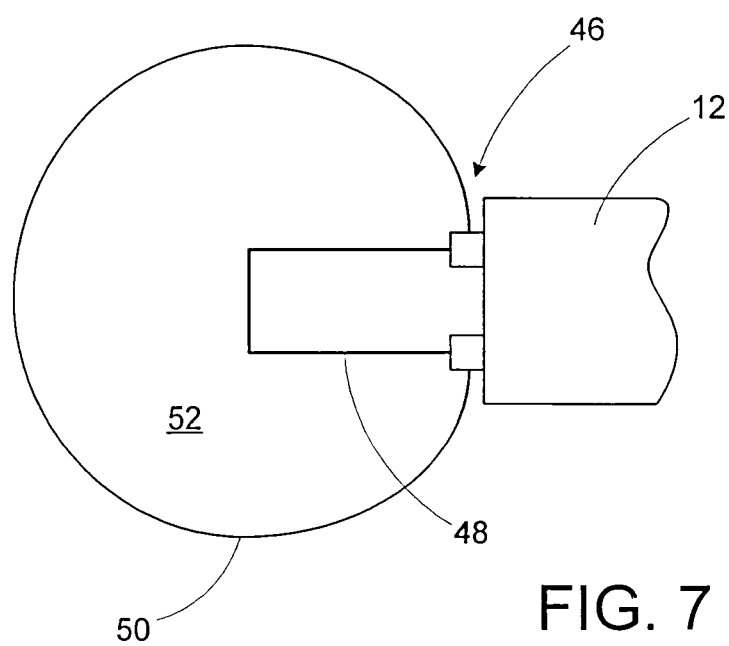
FIG. 7 is a diagram of part of an RFID device in accordance with a still further embodiment of the present invention.

As an alternative, shown in FIG. 7, the second contacts or port 46 could be configured with a very high input capacitance (e.g., 2-20 pF) and a high real part of the impedance (e.g., between 5000 and 20000 Ohms). This allows a conductor loop 50 to be placed in parallel with the port 46, and to be resonant at UHF frequencies. The loop 50 allows a very large Q. The loop 50 encloses an area 52. This enclosed area 52 enhances the new magnetic field sensitivity for the antenna 48.

The RFID device 10 described in the various embodiments above may be a UHF RFID device. UHF antennas and readers are small compared to the readers and detection devices commonly employed for detecting magnetic EAS devices. This allows EAS detection to be performed unobtrusively, such as by mounting in or on a ceiling or floor. This removes obstacles at a store's exit.

In addition it will be appreciated that a cost saving is involved in integrating the RFID and EAS functions in a single RFID device, without the need for additional structural components to perform the EAS function. This results in increased functionality with little or no increase in the cost of the RFID device.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A radio frequency identification (RFID) device comprising:
    an antenna; and
    a chip operatively coupled to the antenna;
    wherein the chip includes circuitry to selectively operate by automatically shifting the RFID device in any one of two modes based on characteristics of incoming signals:
    a relatively low sensitivity RFID mode used for communicating with RFID readers/detectors; and
    a relatively high sensitivity electronic article surveillance (EAS) mode for communicating as EAS readers/detectors;
    wherein the chip uses less power from a power storage block in the EAS mode than in the RFID mode; and
    wherein the chip is configured to reflect an incoming signal with less of an impedance change in the EAS mode than in the RFID mode, so that the chip can rectify power during the response period.

2. The RFID device of claim 1, wherein the circuitry includes circuitry for switching off digital blocks of the circuitry for the EAS mode.

3. The RFID device of claim 1, wherein the circuitry includes circuitry reducing modulation of communications in the EAS mode relative to communications in the RFID mode.

4. The RFID device of claim 1, wherein the circuitry includes circuitry reducing power storage required to initiate communication in the EAS mode relative to the power storage required to initiate communication in the RFID mode.

5. The RFID device of claim 1,
    wherein the chip includes multiple ports for communicating outgoing signals, and
    wherein the RFID mode utilizes one of the ports, and the EAS mode utilizes another of the ports.

6. The RFID device of claim 5, wherein the chip has different respective impedances across the ports.

7. The RFID device of claim 1, wherein communication in the RFID mode has a greater bandwidth than communication in the EAS mode.

8. The RFID device of claim 1, wherein the circuitry includes circuitry allowing communication in both modes simultaneously.

9. A method of utilizing an RFID device for use as an electronic article surveillance (EAS) device, the method comprising:
    entering an improved sensitivity mode of operation based on characteristics of incoming signals that improves sensitivity over that of a normal mode of operation that is used for RFID communication by automatically shifting to the improved mode; and
    while in the improved sensitivity mode, communicating with an EAS reader/detector
    wherein the entering includes reducing power storage required in a chip of the RFID device before communicating with the EAS reader/detector and the chip is configured to reflect an incoming signal with less of an impedance change in the EAS mode than in the RFID mode, so that the chip can rectify power during the response period.

10. The method of claim 9, wherein the entering includes switching off digital blocks in circuitry of a chip of the RFID device.

11. The method of claim 9, wherein the entering includes reducing modulation.

12. The method of claim 9, wherein the entering includes changing impedance of a chip of the RFID device.

13. The method of claim 9, wherein the entering includes reducing power usage of the device.

14. The method of claim 9, wherein the entering includes enabling communication along a port of a chip of the RFID device that is different than a port of the chip used for the normal mode of operation.

15. The method of claim 14, wherein the ports have different respective impedances.

16. The method of claim 9, wherein the entering includes reducing modulation of communications in the improved sensitivity mode.

17. The method of claim 9, wherein the entering includes reducing bandwidth in the improved sensitivity mode relative to the normal mode.

* * * * *